United States Patent [19]
Hagstedt et al.

[11] Patent Number: 5,244,285
[45] Date of Patent: Sep. 14, 1993

[54] HYDROSTATICALLY MOUNTED SQUEEZE FILM DAMPER

[75] Inventors: Bo Hagstedt; Hans-Lennart Olausson, both of Lotorp, Sweden

[73] Assignee: ABB Stal AB, Sweden

[21] Appl. No.: 859,490

[22] PCT Filed: Nov. 14, 1990

[86] PCT No.: PCT/SE90/00732

§ 371 Date: Aug. 17, 1992

§ 102(e) Date: Aug. 17, 1992

[30] Foreign Application Priority Data

Dec. 15, 1989 [SE] Sweden ............................... 8904228-7

[51] Int. Cl.$^5$ ............................................. F16C 39/04
[52] U.S. Cl. ....................................... 384/99; 384/129
[58] Field of Search ................. 384/99, 129, 116, 118, 384/120, 123, 192

[56] References Cited

U.S. PATENT DOCUMENTS

4,971,457 11/1990 Carlson ................................. 384/99
4,971,458 11/1990 Carlson ................................. 384/99

FOREIGN PATENT DOCUMENTS

0164120 11/1985 European Pat. Off. .
1400943 12/1968 Fed. Rep. of Germany .
2105416 3/1983 United Kingdom .

OTHER PUBLICATIONS

Patent abstracts of Japan, vol. 7; No. 177, m 233 abstract of JP 58-81214, publ. May 16, 1983 (Mitsubishi Jukogyo K.K.) (1983).

*Primary Examiner*—Lenard A. Footland
*Attorney, Agent, or Firm*—Pollock, Vande Sande & Priddy

[57] ABSTRACT

Squeeze film damper with a viscous damping agent between two concentric cylindrical surfaces (5) on the internal (3) and external (6) parts, respectively, of the damper. The clearance between these two surfaces (5) is supplied with a viscous damping agent, usually oil, from a groove (4) in the cylindrical surface on the internal part (3) of the damper. This groove (4) does not extend all around. In the lower part of the internal part (3) of the damper there are instead two pockets (7) which are separated from each other and from the long damper oil groove (4). When these two pockets (7) are supplied through channels (8) with oil of an adjusted pressure, a lifting force arises which acts on the internal part (3) of the damper so that this part and the associated shaft (1) are lifted and centered, whereupon during operation a damper clearance, extending all around, is obtained without mechanical means. (FIG. 2)

5 Claims, 1 Drawing Sheet

HYDROSTATICALLY MOUNTED SQUEEZE FILM DAMPER

TECHNICAL FIELD

When shafts in machines, such as turbines and generators, rotate, unbalance forces and various types of instability phenomena arise, which may result in the rotor in a machine being unable to run because of high vibration amplitudes in the machine. In addition, the vibrations may give rise to increased bearing stresses in shaft bearings resulting in increased wear and reduced life thereof. The problems can be solved in various ways. One solution to the problem is to introduce dampers for reducing the vibrations.

BACKGROUND ART

In certain types of machines, such as light gas turbines for aircraft, dampers in the form of squeeze film dampers have long been a standard solution. This type of damper has also proved to be useful in larger machines as well.

If two surfaces with a viscous medium therebetween, for example oil, are brought together at a certain speed, a pressure build-up in the oil is obtained which is proportional to the speed. A squeeze film damper utilizes an oil film as damping agent between two concentric surfaces. In squeeze film dampers the pressure build-up is obtained between the concentric surfaces when the surfaces are vibrating relative to each other. Thus, the damper resembles a cylindrical bearing, with the difference that the internal part of the damper is not rotating. The internal part of the damper consists of the shaft bearing of the machine, which may be of any arbitrary type. In case of vibrations in the shaft, the bearing, i.e. the internal part of the damper, moves in a more or less circular path, which results in the oil film experiencing a squeezing travelling along the circular oil film between the concentric surfaces formed by the external surface of the internal part of the damper and the surrounding internal surface of the holder of the damper. The squeezing generates a rotating pressure front inside the circular oil film. This pressure front acts in a damping manner on the vibrations of the shaft. The machine reacts with lower vibration amplitudes, increased stability and, hopefully, with reduced bearing stresses.

Nowadays, squeeze film dampers are standard machine elements on, for example, gas turbine shafts journalled in roller bearings. They exist in two versions with centered or non-centered mounting. The centered damper is generally coupled with a spring means. The spring means retains the internal part of the damper centered and thus supports the weight of the shaft and the load thereof. The non-centered damper is positioned loosely and is only prevented from rotating. In both types of dampers, the oil, which builds up a squeeze film with a rotating pressure front, is supplied through radial holes bored in a holder for the damper to an annular groove, running along the periphery of the entire damper, in the form of a recess in either the internal part of the damper or in its holder. Because of the pressure of the oil, oil is pressed out from the mentioned groove to the annular gap between the internal part of the damper and its holder. The clearance in this gap is of the order of size of 0.25 mm. Since oil is pressed out of the groove on both sides in the axial direction, a thin oil film arises on both sides of the groove in the damper. This oil film constitutes the viscous medium of the damper itself for the rotating pressure front, the task of the medium being to counteract loads arising through vibrations.

The oil pressure to the damper may be of great importance for the dynamic stiffness of the damper.

In damper designs with a centered damper, the supporting spring is a critical component, especially for large machines. A desirable development of centered dampers would be to exclude the spring means, while at the same time maintaining its centering function.

SUMMARY OF THE INVENTION

The present invention comprises a combined radial bearing and squeeze damper mounted tightly to the rotating shaft of a machine member. The damper is designed as a circular flange which concentrically surrounds the bearing. At its outermost part the flange has a cylindrical surface. This damper flange, in turn, is mounted in a holder with an internally cylindrical surface. These adjoining cylindrical, smooth surfaces constitute so-called damper lands. Between the damper and its holder, i.e. between the damper lands, there is a clearance. This clearance constitutes the space which encloses the viscous medium which represents the pressure medium of the damper and builds up the squeeze film. This squeeze film is supplied with, for example, oil as viscous medium from a groove either in the center of the outwardly-facing cylindrical envelope surface of the outer edge of the flange, or in the center of the inwardly-facing cylindrical envelope surface in the holder of the damper. This groove does not extend fully around, but is discontinuous in its lower part. Instead of the oil groove, one or more pockets have been milled out in the lower part of the damper flange and form separate chambers which do not communicate with each other or with the long groove of the squeeze oil. Bore holes extend to these pockets in the damper support, through which bore holes the pockets may be supplied with oil. When oil from a pump is pressed in through the bore holes and pressurizes the mentioned chambers, the machine shaft will be raised from its rest position on the damper holder. By adapting the oil pressure, the machine shaft may be centered without the use of centering springs. Consequently, the damper is hydrostatically mounted. This hydrostatic damper is fed with lifting oil from a pump with a pressure maintaining valve, which is capable of maintaining the oil pressure and retaining the internal part of the damper in its centered position. The pressure level is selected such that a low dynamic stiffness is imparted to the damper. The magnitude of this pressure is determined, besides by shaft dimensions and loads, also by the geometry of the damper, such as the number of pockets to which lifting oil is supplied, as well as by the total area and location of these pockets.

Oil has been proposed here as viscous medium for building up a squeeze film and as pressure conveying medium for the hydrostatic bearing arrangement. However, there is nothing preventing the use of other viscous media for this purpose. Instead of a pump as transport member for the lifting oil, other members for conveying a medium may, of course, be utilized. The monitoring of the pressure for the medium in the hydrostatic bearing may be accomplished with other automatic regulating devices, as, for example, controlled pumps or controlled valves.

ADVANTAGES

With the described invention, the desired centering of the internal part of the damper is achieved without the use of mechanical means, which has so far been customary, since the shaft is kept in the centered position by hydraulic means. The pressure maintaining valve results in a low stiffness of the centering. In this way, the mechanical stiffness, which is normally high for hydrostatic bearings and which is not desired in this connection, is eliminated.

DESCRIPTION OF THE PREFERRED EMBODIMENTS

Figure 1:
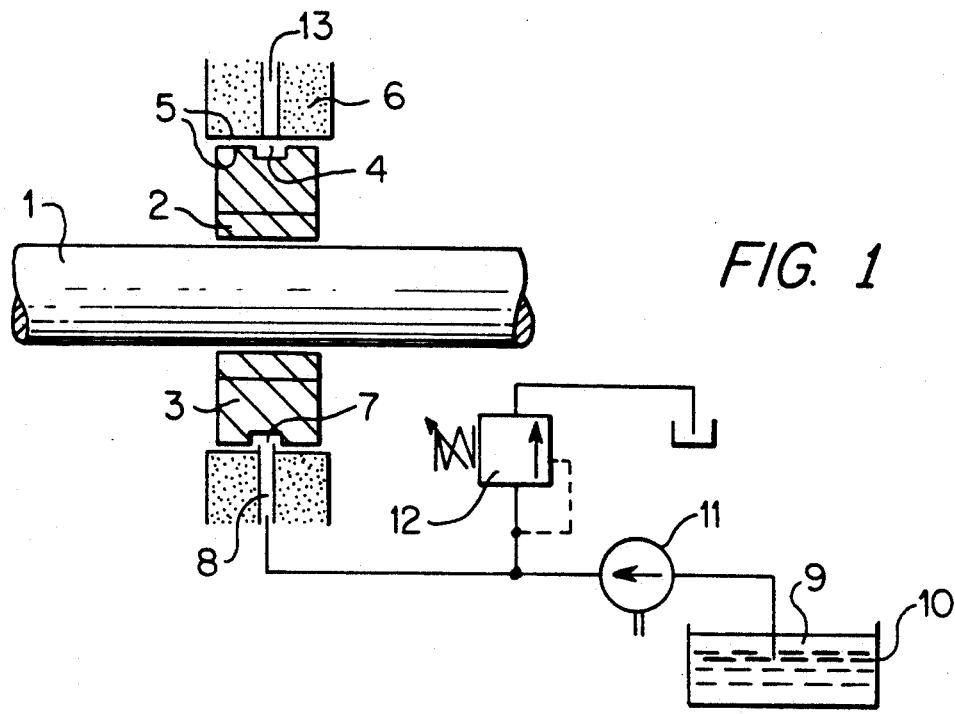
FIG. 1 shows a cross section of an embodiment of the invention along a rotor shaft with associated bearings and dampers. Also the supply with lifting oil and squeeze oil is outlined.
Figure 2:
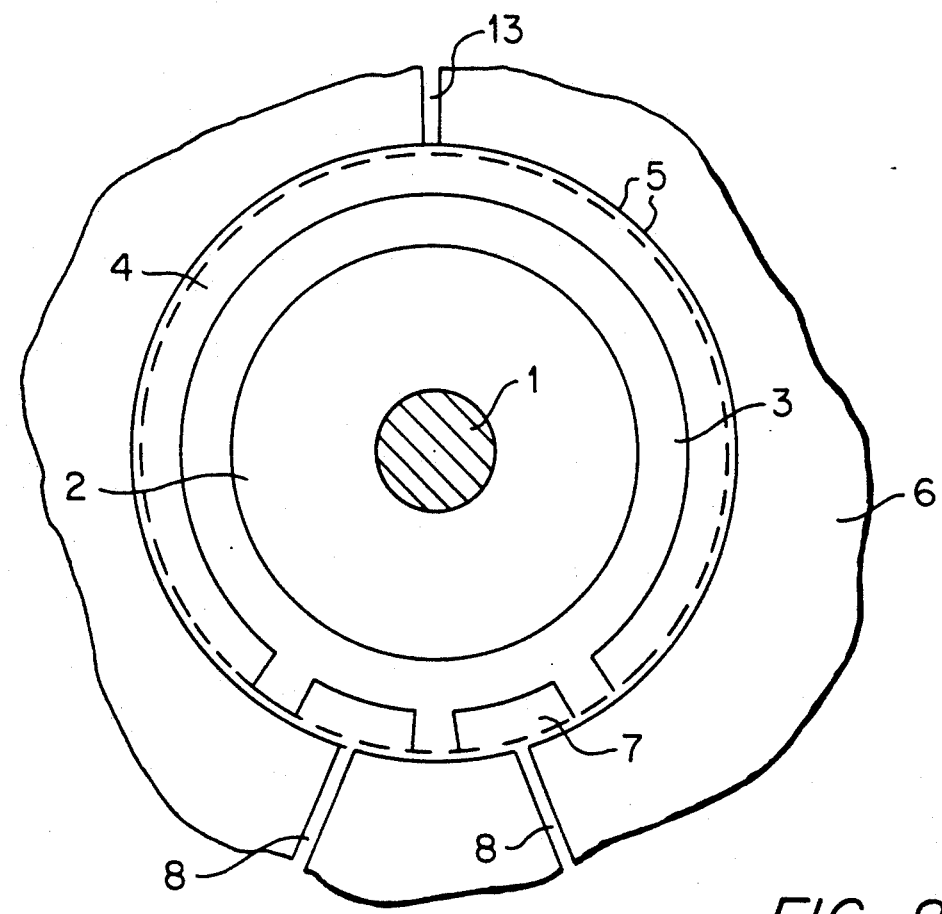
FIG. 2 is a radial cross section of the damper according to the above with a proposed extent of the damper groove as well as a proposal for the location and appearance of the lifting oil pockets.

An embodiment of the described damper is clarified in the accompanying figures. The damped shaft 1 is surrounded by a radial bearing 2, which in turn is surrounded by the damper flange 3. In the central part of the damper flange 3 a milled-out groove 4 is provided, which is filled with oil which leaks out into the clearance between the damper flange 3 and the holder 6 of the damper. The two confronting surfaces of the holder 6 and the flange 3 constitute the damper lands 5. The surfaces of these damper lands 5 may be cylindrical or constitute the curved surfaces of two concentric spherical segments with two bases. The clearance between these surfaces is filled up by the oil which constitutes the actual damping agent. FIG. 2 shows that the groove 4 in the flange 3 is circular, but that it does not extend around the entire turn. Two pockets 7 are recessed in the lower part of the damper flange, the pockets being separated from each other and from the damper groove 4 by partitions. Holes 8, leading up to these pockets 7, have been bored in the holder 6, suitably radially towards the interior of the center. By supplying oil under pressure through the holes 8, the damper flange 3 with radial bearing 2 and damped shaft 1 may be raised to a centered position. The two lifting oil pockets 7 are, for example, symmetrically located on one side each of the perpendicular symmetry axis to obtain centering forces from the oil-filled pockets 7. The oil 9 to the two pockets is obtained from the oil container 10, from which the pump 11 supplies the damper with oil. On its way to the damper, the oil 9 passes through a pressure maintaining valve 12, which monitors the pressure in the conduit and thereby retains the internal part of the damper at the desired level and also reduces the dynamic stiffness in the damper. The oil supply to the squeeze damper takes place through the oil inlet 13, which also supplies the bearing 2 with oil.

In other embodiments, the damper may alternatively be provided with another number of pockets 7. It is possible to reduce the need to only one pocket 7. In this version it may be more difficult to obtain a sufficiently centering function, acting on the damper, from the pressure medium when pressure is applied to this medium. The shape and length of this single pocket 7 may, however, influence the centering function of the damper in this simpler embodiment.

A greater possibility of directly controlling the centering function and the stiffness of the damper is obtained if the number of pockets 7 is three or more. If there are, for example, three pockets 7, one of these may, for example, be placed below the center of rotation of the shaft. The other two pockets 7 may then be located on either side of the first pocket along the periphery of the damper. This may lead to the desired centering.

In the proposed embodiment, the pockets 7 for lifting oil have been milled out in the internal part of the damper, the damper flange 3. Another solution is instead to mill out, in a corresponding way and at corresponding locations, these pockets in the holder 6 of the damper.

We claim:

1. A device in squeeze film dampers for shaft bearings comprising
   a bearing (2) mounted on a shaft (1),
   a damper flange (3) mounted outside the bearing (2) and concentrically enclosed in a holder (6) for the damper,
   between the concentric surfaces of the damper flange (3) and the holder (6), a clearance which forms a space for the squeeze film of the damper,
   characterized in that the damper flange (3) and its holder (6) comprise two concentric surfaces (5) adjoining each other, along the circumference of which there are at least two pressure medium spaces separated from each other, namely an upper space (4) and one or more lower (7) spaces, of which at least said one or more lower spaces, when being connected to a pressurized pressure medium (9), bring about a lifting and centering of the internal part of the damper and a damping with a dynamic stiffness which may be controlled with a member (12) for maintaining the pressure.

2. A device in squeeze film dampers according to claim 1, characterized in that the pressure medium spaces (7) in the lower part of the damper are separated from each other and from the upper pressure medium space (4) by partitions.

3. A device in squeeze film dampers according to claim 1, characterized in that the lower pressure medium spaces (7) may be supplied with pressure medium (9) through channels (8) in the holder (6) of the damper with a member (11) for transport of pressure medium (9).

4. A device in squeeze film dampers according to claim 3, characterized in that the internal part of the damper may be centered by conducting pressure medium (9) through the channels (8) to the lower pressure medium spaces (7), said pressure medium raising the internal part of the damper hydraulically into a centered position, and by retaining the internal part of the damper in that position with the aid of a controlled medium pressure brought about with a member (12) for maintaining the pressure and with a medium pressure selected so that a low dynamic stiffness is imparted to the damper.

5. A device in squeeze film dampers according to claim 1, characterized in that the upper pressure medium space (4) is supplied with a viscous medium for building up a squeeze film through a separate channel (13).

* * * * *